Oct. 18, 1949.											K. A. KAIL											2,485,293
					AVIATION TRAINER ARTIFICIAL HORIZON
						SIMULATOR ACTUATING MEANS
Filed Oct. 18, 1945											4 Sheets-Sheet 1

KARL A. KAIL
*INVENTOR.*

BY
ATTORNEYS

KARL A. KAIL
INVENTOR.

BY
ATTORNEYS

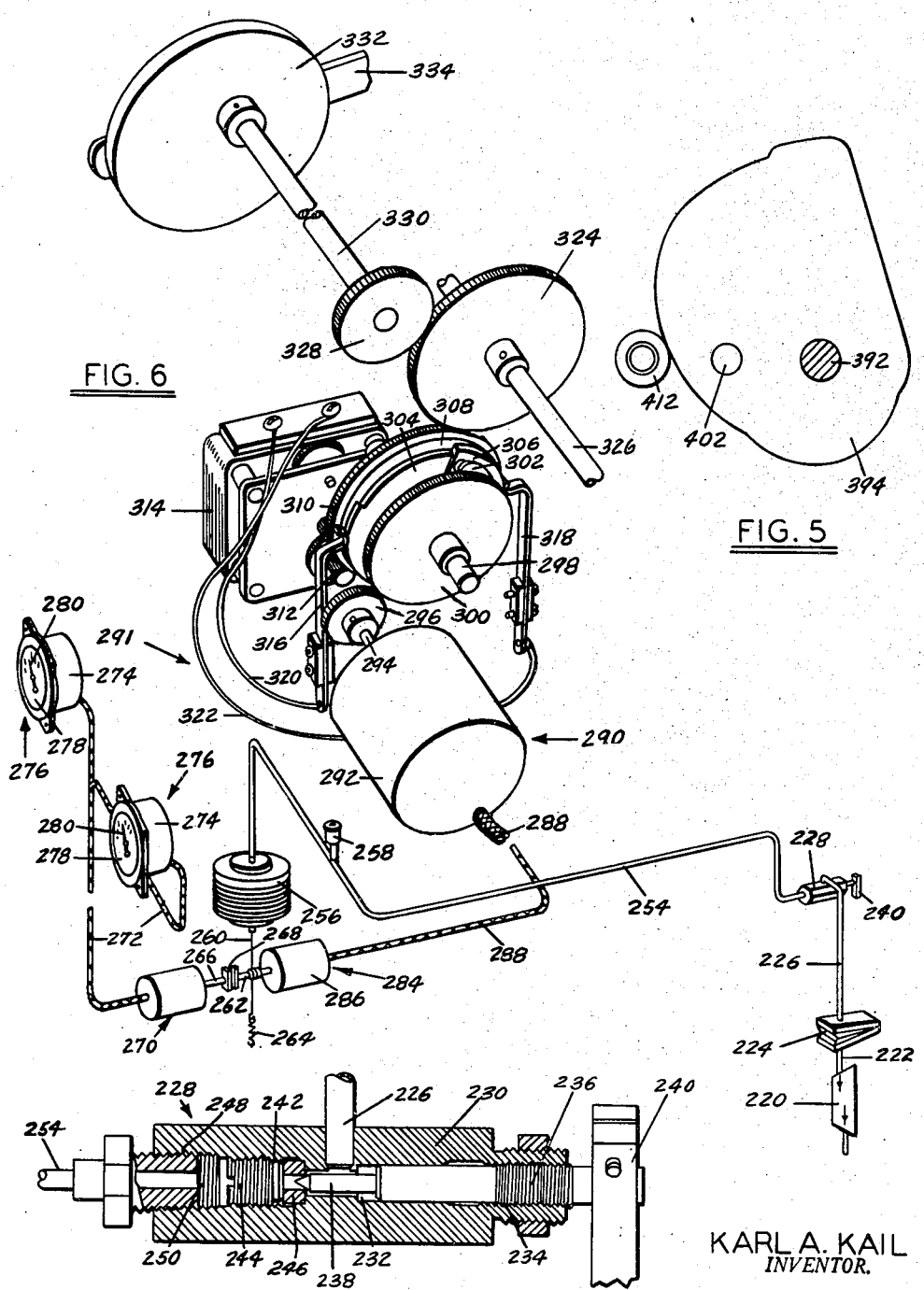

Patented Oct. 18, 1949

2,485,293

UNITED STATES PATENT OFFICE 2,485,293

AVIATION TRAINER ARTIFICIAL HORIZON SIMULATOR ACTUATING MEANS

Karl A. Kail, Montrose, Pa., assignor to Link Aviation, Inc., a corporation of New York Application October 18, 1945, Serial No. 623,075

3 Claims. (Cl. 35—12)

This invention relates to improvements in grounded aviation trainers and more particularly to improvements in means for actuating artificial horizon simulators which are used in grounded aviation trainers.

My invention will be disclosed when used in conjunction with an artificial horizon simulator such as that disclosed and claimed in my copending application Serial Number 623,076, filed the same day as this application, and also when incorporated in aviation trainers of the grounded type as disclosed in U. S. Patents 1,825,462 and 2,099,857 issued to Edwin A. Link. However, it will be appreciated that my invention may be used in conjunction with other types of simulators and in conjunction with other types of grounded aviation trainers.

Instrument flight, as is well known to those skilled in the art, consists in the guiding of airplanes in their course of flight by reference to instruments which are mounted upon the instrument panel of the airplane. One of the most commonly employed instruments is a device referred to as the artificial horizon. The artificial horizon is a direct reading instrument which indicates at all times the bank and pitch attitude of the aircraft in which it is carried. In aircraft artificial horizons there is found a freely mounted gyroscope placed inside an instrument case which is fixed to the aircraft. When the aircraft banks or pitches the instrument case moves therewith but the gyro mounted inside maintains its stable plane of rotation in space. Also affixed to the instrument casing for movement therewith and with the airplane is an airplane simulating element, while controlled by the freely mounted gyroscope is a slender bar which is referred to as the horizon bar. Accordingly, when the aircraft pitches or banks, the stability of the gyro maintains the horizon bar parallel to the real horizon, but the airplane simulating element affixed to the instrument case moves with the airplane and relative to the horizon bar. Accordingly, when the airplane is placed in a diving attitude, by virtue of a suitable reversing mechanism, the airplane simulating element and horizon bar are moved into a position relative to one another whereby the airplane simulating element is below the horizon bar. This relative position indicates to the pilot that the plane is in a nose-down position. On the other hand, when the plane is placed in a nose-up position, the relative positions of the airplane simulating element and the horizon bar are reversed and the pilot knows, by reference to the instrument, that the plane is climbing. When the airplane is banked to the left, the horizon bar remains level but the airplane simulating instrument carried by the instrument case is rotated counterclockwise and the left wing of the airplane simulating element drops below the horizon bar and the right wing rises above the horizon bar, thus indicating to the pilot that the plane is in a left bank. On the other hand, when the plane assumes a right banking position the relative positions of the wings of the airplane simulating element and of the horizon bar are reversed so that the pilot knows that the plane is in a right banking position.

Artificial horizons as used in aircraft are also provided with a manually controllable knob placed at the bottom of the instrument by means of which the pilot may adjust the vertical position of the airplane simulating element when the plane is in level flight, so that he sees the horizon bar in the same horizontal plane as the wings of the airplane simulating element.

Artificial horizon simulators for use in grounded aviation trainers of the type being considered have been known to the prior art for many years, and the readings of such instruments have followed somewhat the same general pattern in response to pitching and banking movements of the trainer fuselage as occurs in the case of a real artificial horizon carried by a plane in actual flight. Such instruments, however, instead of employing a gyroscopic element have utilized a pair of pendulums in order to actuate the instrument to give the generally correct indications in response to pitching and banking movements of the fuselage. However, due to the inherent design of the previously used artificial horizon simulators, the instruments known to the prior art were not as steady as the corresponding real aircraft instruments.

As stated in my copending application Serial Number 623,076 it is a principal object of that application to replace the prior art pendulum actuating means by direct mechanical connections which may be actuated by the pitching and banking movements of the fuselage, or equivalent mechanism when used in trainers not having a movable fuselage, to properly position the horizon bar and the airplane simulating element relative to one another according to the pitching and banking position of the fuselage. As will be disclosed, this change in actuating means has resulted in a completely new form of artificial horizon simulator, retaining only the outward appearance of the prior art instruments which, of course, was the same as the real artificial horizons as described above.

Another basic difficulty with the prior art artificial horizon simulators was that the simulators were not arranged to properly indicate the degree of bank of the fuselage in conjunction with other prevailing assumed conditions. More specifically, in the case of actual air craft performance, when the aircraft is properly banked and is making a standard rate turn (a turn of 180 degrees in 60 seconds), the aircraft must be banked at varying angles in accordance with the air speed of the plane. This angle of bank increases as the air speed of the plane increases. For example, in the case of a standard rate turn at 160 miles per hour, an aircraft must be banked at about 21 degrees and the banking angle increases about 13 degrees for every increase of 100 miles per hour of air speed.

In the prior art trainers using the conventional prior art artificial horizon simulator, regardless of the reading of the air speed indicator in the trainer, whenever the turn and bank indicator used in the trainer indicated to the student that he was making a properly banked turn, i. e., the ball of the clinometer was centered, the fuselage would always be banked a given number of degrees and the artificial horizon simulator would always indicate a given number of degrees of bank, regardless of assumed air speed. For example, assuming the turn and bank indicator in the fuselage indicated a properly coordinated standard rate turn (ball centered), the fuselage would always be banked the same number of degrees, for example, ten. Accordingly, the artificial horizon simulator would always indicate to the student that the trainer was banked 10 degrees for a properly coordinated standard rate turn. When the air speed indicator indicated an assumed air speed of 160 miles per hour and the turn and bank indicator indicated that a properly banked standard rate turn was being made, the artificial horizon simulator would indicate a degree of bank (ten degrees) impossible under the circumstances.

It is a principal object of this invention to disclose and claim means connected to the air speed system in the trainer and responsive to the instant assumed air speed as well as instant banking position of the trainer, so that whenever the turn and bank indicator indicates to the student that a properly banked standard rate turn is being made, the artificial horizon indicator will indicate to the student the same angle of bank for the instant assumed air speed as the corresponding real artificial horizon in a plane in actual flight would indicate under corresponding actual conditions.

It is a further general object of this invention to generally improve the artificial horizon simulator actuating means used in grounded aviation trainers, and especially trainers having a universally movable fuselage.

In order that the detailed nature of my invention may be better understood, reference is made to the accompanying drawings which disclose a preferred embodiment of this invention. In the drawings, Fig. 1 is a general view of trainers of the type with which my invention will be illustrated.

Fig. 2A is a detailed view of the reversing pulley arrangement of Fig. 2.

Fig. 2B is a detailed elevational view of a pulley shown in Fig. 2.

Fig. 5 is an elevational view of a cam shown in Fig. 2, this view being taken from the right side of the trainer.

Fig. 6 is a perspective view of the pertinent parts of the air speed system of trainers of the type being considered.

Fig. 7 is a detail cross sectional view of the air speed regulator valve shown in Fig. 6.

Figure 1:
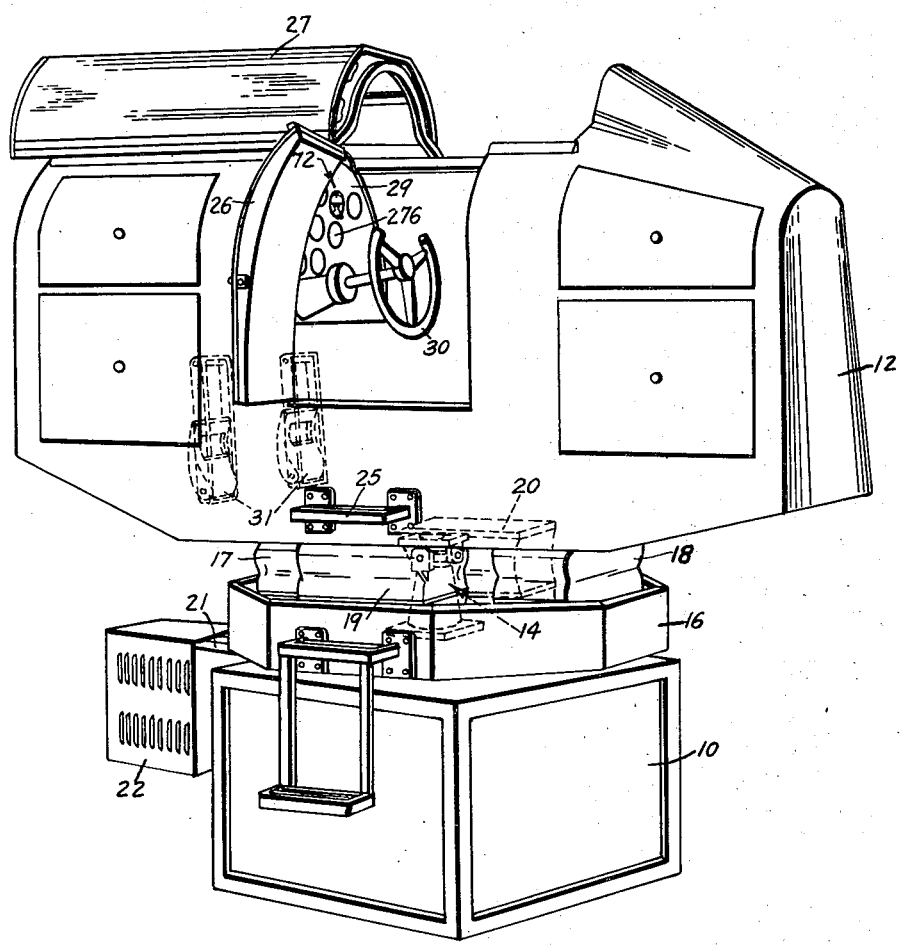
Figure 2:
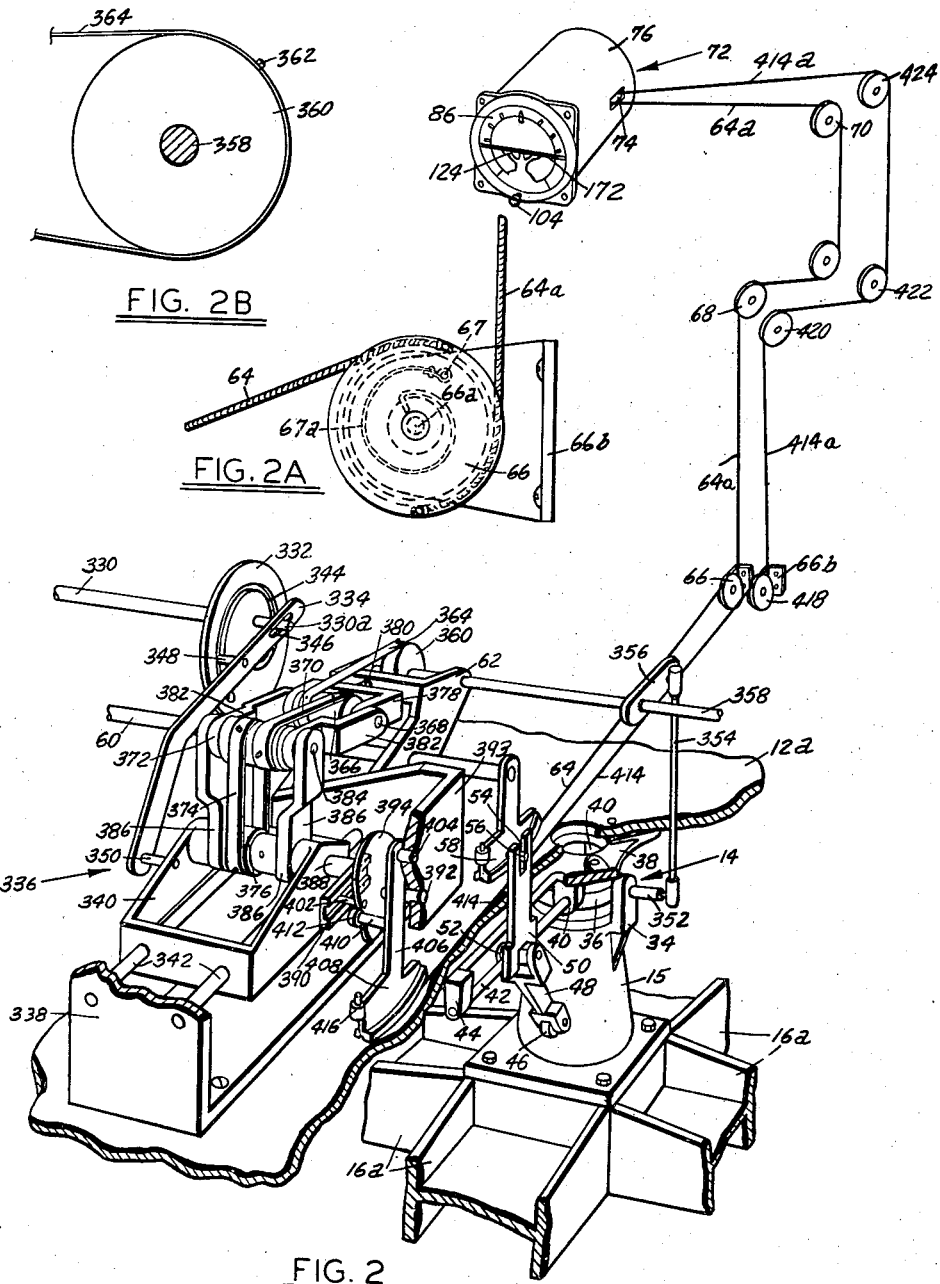
Fig. 2 is a detailed perspective view of the trainer pitch and bank takeoff apparatus together with the means for integrating the factors of assumed air speed and banking position, this view being taken from the rear left side of the trainer.

Reference is now made to Fig. 1 which is a general disclosure of grounded aviation trainers of the type covered by U. S. Patents 1,825,462 and 2,099,857. Such trainers comprise a stationary base 10 above which is mounted a fuselage 12 simulating the fuselage of an actual aircraft. Within this fuselage there is a seat for a student positioned to the rear of the control wheel 30. The fuselage 12 rests upon a universal joint designated generally by 14, as best seen in Fig. 2, and this joint is supported by the main pedestal 15 which is in turn supported by a vertical spindle which is rotatably held in the stationary base 10. The conventional octagon is designated by 16 and as is well known to the prior art, octagon 16 is affixed to the main pedestal 15 below the universal joint 14 by means of the horizontal arms 16a so that the octagon 16 rotates with the pedestal 15, spindle and fuselage 12 relative to the stationary base 10.

A forward pitching bellows 17 and a rearward pitching bellows 18 are provided, the bottom portions of each of these bellows being affixed to the arms 16a which hold the octagon 16 relative to the pedestal 15, and the upper ends of these bellows are affixed to the bottom of the fuselage 12. These two bellows lie in a vertical plane through the longitudinal center of the fuselage 12. Upon the admission of vacuum to the forward bellows 17 and atmosphere to the rear bellows 18, the former bellows collapses and the latter expands causing the fuselage 12 to assume a diving attitude. On the other hand, admission of vacuum to the rear bellows 18 and of atmosphere to the fore bellows 17 causes the fuselage 12 to assume a climbing attitude. As is generally known to the prior art, the admission of vacuum and atmosphere into the bellows 17 and 18 may be controlled by the student in the trainer by moving the control wheel 30 fore and aft of the fuselage 12, so that the student may control the diving and climbing position of the fuselage 12. The diving and climbing positions of the fuselage are sometimes referred to herein as "pitching."

At the same time trainers of this type have a left banking bellows 19 as well as a right banking bellows 20 upon the opposite side of the universal joint 14 from the bellows 19. The admission of vacuum and air into these bellows may be controlled by the student through a rotation of the control wheel 30 so that he may place the fuselage 12 in any desired banking position, within the limits of the apparatus.

Fixedly carried by the octagon 16 are the horizontal arms 21 which support the turning motor 22. By means of a well known pulley arrangement connecting the turning motor 22 with the stationary base 10, the student in the fuselage 12 may, by pressing either of the rudder pedals 31, energize the turning motor 22 in such a direction that the turning motor 22, supporting arms 21, octagon 16, bellows 17, 18, 19 and 20, pedestal 15, its supporting spindle, universal joint 14, and fuselage 12 will rotate either to the left or right, as desired, relative to the stationary base 10. Thus the student may control the simulated heading of the fuselage 12 in the same manner that he would control the heading of a plane in actual flight.

The steps 25 and door 26 allow access to the interior of the fuselage 12 and a slidable canopy 27 may be used to completely encompass the cockpit of the fuselage 12 in order to simulate blind flying conditions. The canopy 27 may be made of a suitable translucent material in order to permit enough light to enter the cockpit of the fuselage to enable the student to manipulate the trainer without the assistance of artificial lights placed in the interior of the fuselage. Such conditions closely simulate day-time blind flight conditions. On the other hand when it is desired to simulate night-time blind flying conditions, a suitable opaque material such as a cover may be placed over the canopy 27 in order that no light enters the cockpit through this canopy. The student must then rely upon the conventional artificial lights which are placed inside the cockpit. Such an arrangement closely simulates night-time blind flying conditions.

An instrument panel 29 is inside the fuselage and upon this panel are instruments which simulate the instruments carried by actual aircraft. As is well known to the prior art and disclosed in U. S. Patent 2,099,857, these instruments operate in response to simulated conditions just as the corresponding instruments in a real plane react to real flight conditions. Inasmuch as trainers of the type being considered are primarily used in the teaching of students to fly airplanes by reference to the instruments in the plane, the instrument panel 29 carries a full complement of instruments. For example, it is customary to provide an air speed indicator and altimeter, a vertical speed indicator, magnetic and radio compasses, a turn and bank indicator, a directional gyro, many engine instruments, as well as an artificial horizon, with which last instrument this invention is primarily concerned.

Proceeding now to a detailed disclosure of the nature of the aviation trainer illustrated herein, reference is made to Fig. 2 where it will be seen that the pedestal 15 has formed integrally therewith a pair of ears 34 (only one shown), these ears being upon opposite sides of the longitudinal center line of the fuselage 12. The ears 34 support the ring 36 so that the ring and all elements supported thereby are free to tilt about an axis transverse of the fuselage 12 and passing through the ears 34. A casting 38 is affixed to the underside of the floor 12a of the fuselage 12 and this casting has a pair of depending ears 40 which are pivotally supported by the ring 36. The ears 40 and consequently the fuselage 12 are free to pivot about an axis longitudinal of the fuselage and passing through the ears 40 and ring 36. It will therefore be appreciated that the fuselage 12 and fuselage floor 12a are free to assume any pitching or banking position relative to the stationary base 10 within the limits of the apparatus.

Still referring to Fig. 2 it will be seen that a rod 42 is fixedly carried by the rear ear 40 and a suitable stop 44 is placed upon the rear end of this rod. Integral with the lower portion of pedestal 15 is the ear 46 to which the lower end of arm 48 is pivotally connected. The upper end of arm 48 is pivotally attached to the lower end of the vertical carriage 50 which is provided with suitable rollers 52 for reciprocation along rod 42. A slot 54 is placed in the upper end of carriage 50 and a stud 56 extends through this slot. Stud 56 is fixedly held by the lower end of sector 58, the upper end of which is fixedly held by the shaft 60 which is rotatably mounted within the frame member 62 which in turn is rigidly affixed to the bottom 12a of the fuselage.

Bearing in mind the detailed description of the apparatus shown in Fig. 2, it will be appreciated that whenever the student within the fuselage pushes the control wheel 30 ahead so as to place the fuselage 12 in a diving attitude, the rear end of rod 42 will move upwardly. Arm 48 will therefore slide the vertical carriage 50 toward the head of the fuselage 12 and the stud 56 will be moved in the same direction, stud 56 carrying the lower end of sector 58 toward the head of the fuselage. The shaft 60 will be rotated counterclockwise as seen from the right side of the fuselage 12.

On the other hand it will be appreciated that should the fuselage 12 be placed in a climbing position by the student through a manipulation of the control wheel 30, the carriage 50 will be moved toward the rear of the fuselage and the lower end of sector 58 will be moved in the same direction. A clockwise rotation will be imparted to the shaft 60.

As is well understood in the prior art, the rotation of shaft 60 as a result of changes in the pitch attitude of fuselage 12 may be used to introduce into the apparatus within the fuselage 12 the factor of pitch attitude which is used to control in part the readings of the air speed indicator, altimeter, vertical speed indicator and other pitch-responsive instruments which are conventionally placed upon the instrument panel 29.

In Fig. 2 it will be seen that the rear end of cable 64 is attached to the lower end of sector 58, this cable extending toward the front of fuselage 12 and, as seen in Fig. 2A, has its forward end anchored to the pulley 66 which is mounted for rotation upon shaft 66a held by bracket 66b which is suitably affixed to the inside of the fuselage 12. A stud 67 is fixedly carried by the bracket 66b, and the outer end of spring 67a is anchored upon this stud, the inner end of this spring being affixed to the hub of pulley 66. This spring arrangement places a clockwise bias upon pulley 66. The upper cable 64a has its lower end affixed to pulley 66, as shown, and then encircles pulleys 68 and 70 and enters the artificial horizon simulator designated generally by 72 through the slot 74.

Figures 3, 3A, 3B, 4:
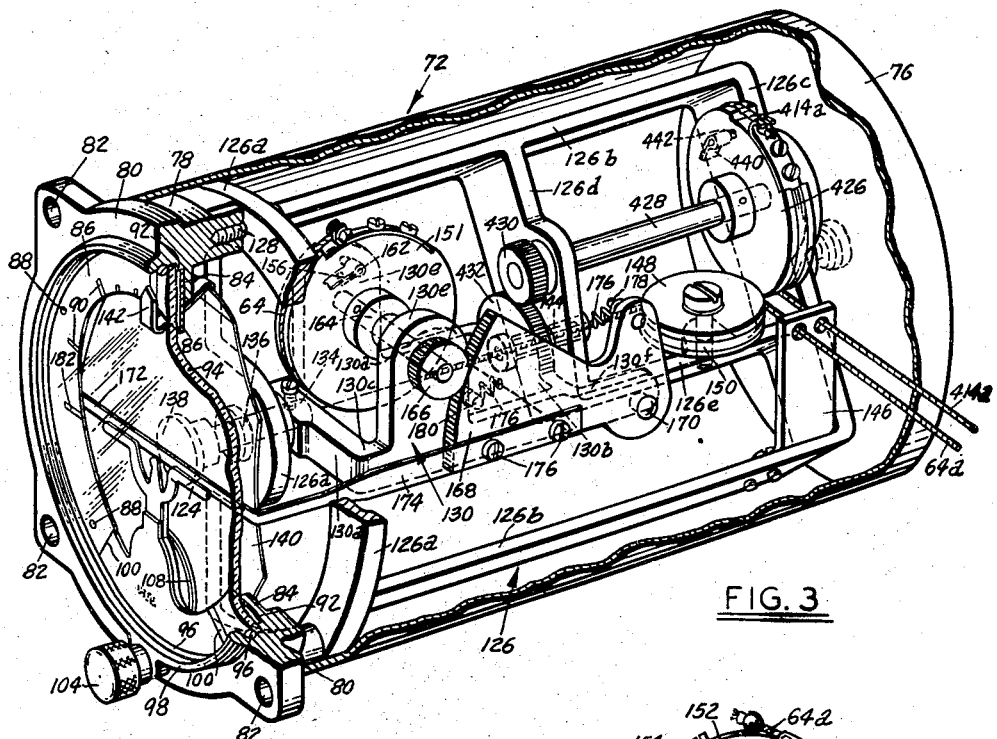
Fig. 3 is a detailed perspective view of the improved artificial horizon simulator of this invention.
Fig. 3A is a left elevational view of a pulley and spring arrangement shown in Fig. 3.
Fig. 3B is a detailed view of a portion of the instrument shown in Fig. 3.
Fig. 4 is a detailed view of the manual adjusting arrangement shown in Fig. 3.

Reference is now made to Fig. 3 for a detailed disclosure of the improved artificial horizon simulator designated generally in Fig. 2 by 72, which simulator is claimed per se in my copending application Serial Number 623,076.

It will be seen that the artificial horizon simulator comprises a cylindrical exterior casing 76 which snugly fits around the smooth annular surface 78 of the casting 80 which is provided with suitable screw holes 82 so that the instrument may be affixed upon the instrument panel 29. The casting 80 is provided with an innermost interior flange 84 against which abuts the index plate 86 which is affixed to the flange 84 by means of pins 88. The index plate 86 is provided with a plurality of index marks 90 simulating the corresponding index marks of a real artificial horizon instrument. The casting 80 is provided with a shoulder 92 against which the flat circular glass plate 94 rests. A snap ring 96 holds the glass plate 94 in position and the snap ring 96 is in turn held by the lip 98 which is integral with casting 80. It should be noted that the lower portion of index scale 86 is offset at the points 100 so that this lower portion is closer to the glass plate 94 in order to provide clearance for the elements positioned directly therebehind.

Reference is now made to Fig. 4 which discloses in detail a portion of the instrument shown in Fig. 3. In Fig. 4 it will be seen that the shaft 102 is rotatably mounted within the lower portion of casting 80 and upon the outer end of this shaft is rigidly affixed the manually movable knob 104. A friction drive wheel 106 is affixed upon the interior end of shaft 102, this wheel being placed between the two frictionally driven discs 108 which are affixed upon the interior end of the shaft 110 which is rotatably held by the extension 80a which is integral with the casting 80. A spur gear 112 is mounted upon the forward end of shaft 110, this gear engaging the teeth in the lower end of the vertically movable rack 116. A pin 118 is carried by the upper end of the rack 116 and this pin is guided by the slot 122 in the uppermost portion of the extension 80a of casting 80. The airplane simulating element 124 is integral with the rack 116, this airplane simulating element having a pair of arms which represent the wings of an airplane.

It will be appreciated that the arrangement in Fig. 4 is such that by selectively rotating the control knob 104, the airplane simulating member 124 may be moved up or down. Also, the airplane simulating element 124 will remain in any position in which it is placed. The purpose of this adjustable arrangement will be later described.

Referring now to Fig. 3 it will be seen that a main frame casting designated generally by 126 is provided, this casting having a foremost portion 126a parallel to the glass plate 94, two parallel rearwardly extending side members 126b, a rear member 126c, an intermediate cross member 126d, and member 126e connecting the lower end of member 126d and the rear member 126c. All parts of casting 126 are integral, and this casting is affixed to the front casting 80 by screws 128. A second casting designated generaly by 130 is provided, this casting comprising two parallel end members 130a and 130b, two parallel side members 130c and 130d, two parallel ears 130e held by the sides 130c and 130d, and a rear extension 130f, as shown in part in Fig. 3B. The front portion 130a of this casting is affixed upon the shaft 134 which is rotatably mounted within the bearing 136 carried by the portion 126a of casting 126. Upon the forward end of shaft 134 is the integral enlarged flange 138 and welded upon the end portion 138 is the convex plate 140 which serves as a background disc, the convex side being positioned toward the glass plate 94. Affixed to the convex plate 140 is the index pointer 142 which is positioned for cooperation with the index scale 86. Casting 130 is rotatably mounted upon the hollow bearing 144, the rear end of which is carried by the central generally vertical member 126d of the casting 126. Bearing 144 is coaxial with bearing 136 which supports the fore end of casting 130. It will therefore be appreciated that the casting 130 is free to move about an axis longitudinal of the casing 76.

Still referring to Fig. 3, it will be seen that the cable 64a which, it will be recalled, is moved in response to a change in the pitching attitude of the fuselage 12, passes through a hole in the guiding bracket 146 which is held by the casting 126, and encircles the pulley 148 which is rotatably held by the stud 150 which is carried by casting member 126e. Cable 64a passes through the hollow bearing 144 which supports the casting 130 and encircles the outside of the pulley 151 as shown. (Pulley 151 is fixedly mounted upon the shaft 164 which is rotatably held by the ears 130e integral with casting 130.)

Referring to Fig. 3A, which shows in detail the pulley 151, it will be seen that the end of cable 64a is anchored to the plate 152 which in turn is affixed to the pulley 151 by means of screws 154. It will be seen that a torsion spring 156 is provided, the interior end 158 of this spring engaging the hub 160 of the pulley and the outer end of the spring 156 is affixed to the stud 162 which is held by one of the ears 130e integral with casting 130. By virtue of the just described spring arrangement, it will be appreciated that a clockwise bias in Fig. 3 is applied at all times to the pulley 150 by the spring 156. At this point it might be stated that the spring 67a in Fig. 2A is stronger than the spring 156 so that when the lower cable 64 is pulled the upper cable 64a also moves, against the action of spring 156. When lower cable 64 is relaxed spring 67a in Fig. 2A rotates pulley 66 to keep the cable taut, and at the same time relaxes the upper cable 64a. Simultaneously, spring 156 rotates pulley 151 to keep the upper cable 64a tight. Upon the right end of shaft 164 is affixed the spur gear 166 which drives the gear sector 168 which is pivoted upon the stud 170 which is held by the extension 130f of casting 130. A spring 176 having one end anchored upon the stud 178 held by the sector 168 and its other end held by the stud 180 carried by the ear 130e is provided to remove back-lash between sector 168 and gear 166. The horizon bar 172 has integral therewith the rearwardly extending portion 174 which is affixed to sector 168 by means of screws 176. The horizon bar 172 is positioned to the rear of the airplane simulating element 124 and ahead of the convex plate 140.

Referring back to Fig. 2, it will be recalled that when the fuselage 12 assumes a diving attitude the carriage 50 moves ahead and this movement also moves ahead the lower portion of sector 58. Accordingly, the rear end of cable 64 is relaxed and the reversing pulley arrangement 66 will result in a pull upon the upper cable 64a. Pulley 151 in Fig. 3 will therefore be rotated counterclockwise against the torsion of spring 156.

The counterclockwise rotation of pulley 151 will result in a counterclockwise rotation of gear 166 and the rotation of this gear will impart a clockwise movement to the sector 168, this sector pivoting about the stud 170. The horizon bar 172 will therefore move upwardly.

On the other hand, should the trainer fuselage 12 assume a climbing attitude, the pull upon cable 64 will result in a clockwise rotation of the pulley 150 because of the action of spring 156 and the sector 168 will be rotated counterclockwise. The horizon bar 172 will therefore move downwardly.

It will be appreciated, that the apparatus of this invention may be initially adjusted so that when the fuselage 12 is in a level flight position, the horizon bar 172 will be vertically placed exactly opposite an initial point such as the index mark 182. Further, when the student begins his practice period he may place the fuselage 12 in the level flight position and then by means of the manual control knob 184 he may vertically position the airplane simulating element 124 so it is properly aligned with the horizon bar 172. Thereafter, whenever the fuselage 12 is placed in a diving position, the horizon bar 172 moves upwardly by an amount proportional to the departure of the fuselage 12 from level flight and indicates to the student within the fuselage the assumed angle of dive. On the other hand, whenever the fuselage 12 is placed in a climbing position, the horizon bar 172 moves downwardly a distance proportional to the angle of climb and indicates to the student the assumed angle of climb of the fuselage 12.

Accordingly, the horizon bar and airplane simulating element have their relative positions changed in response to changes in the pitch attitude of the fuselage in the same manner that the corresponding parts of a real instrument react to changes in the pitch attitude of a real plane.

It has been previously explained that one of the objects of this invention is to provide an artificial horizon simulator actuating means for use in grounded aviation trainers in which the horizon bar may be properly moved relative to the airplane simulating member when the trainer is laterally banked, the relative movement of these two members being according to the degree of bank of the fuselage. This feature of the present invention will now be explained.

Reference is now made to Fig. 6 which is a schematic illustration of a portion of the means which may be used in trainers of the type being considered for developing the factor of assumed air speed. In Fig. 6 there is diagrammatically shown a suitable source of vacuum 220 which is connected by the vacuum line 222 to the conventional step down regulator bellows 224. Bellows 224 is connected through vacuum line 226 with the air speed regulator valve 228 which is shown in detail in Fig. 7 to which reference is now made. Referring to Fig. 7 it will be seen that the air speed regulator valve comprises a main housing 230 which may be suitably affixed to the floor 12a of the fuselage 12. Housing 230 has a central bore 232 which extends completely therethrough. The interior right end of bore 232 is threaded at 234 for coaction with the threads 236 which are integral with the right end of the needle 238 which is placed in bore 232. Upon the outer end of the needle 238 is affixed the operating arm 240. The interior left end of housing 230 is threaded at 242 for the reception of the hollow plug 244 which is threaded upon its outside as shown. Plug 244 positions the seat 246 inside housing 230 as shown. Housing 230 is also interiorly threaded at 248 to receive the hollow plug 250, to which the vacuum line 254 is connected.

Still referring to Fig. 7 it will be seen that the vacuum line 226 is in communication with the longitudinal bore 232 of the housing 230 and that the needle 238 is turned down so that when the needle is displaced from the seat 246 vacuum may pass through the seat and plug 244 to the vacuum line 254. Referring now to Fig. 6 it will be seen that the vacuum line 254 connects with the interior of a large metallic expansible-collapsible metallic bellows 256, the upper end of which is suitably rigidly affixed to a frame member (not shown) which is held by the inside of fuselage 12. A suitable bleed 258 is placed in vacuum line 254. Affixed to the lower end of the bellows 256 is the string 260 which winds around the shaft 262 and continues downwardly having its lower end affixed to the upper end of the spring 264, the lower end of which is affixed to any suitable stationary member within fuselage 12. String 260 engages shaft 262 in such a manner that when the bellows 256 collapses, the upward movement of the string rotates the shaft 262 in a clockwise direction, and when the bellows 256 expands, the spring 264 pulls upon string 260 so that the shaft 262 is rotated counterclockwise. It will be appreciated that the angular rotation of shaft 262 is proportional to the expansion or contraction of bellows 256, and that shaft 262 is always angularly positioned from a predetermined neutral point according to the distension of bellows 256.

Still referring to Fig. 6 it will be seen that a shaft 266 is coaxial with shaft 262. Affixed upon the right end of shaft 266 is one of the elements of a magnetic coupling 268 and affixed upon the left end of shaft 262 is the other element of the magnetic coupling. Consequently shaft 266 always rotates in the same direction and through the same angle as the shaft 262. The shaft 266 is the input shaft of the self-synchronous transmitter designated generally by 270 and which is connected through the electrical cables 272 with the housings 274 of the self-synchronous receivers which form a part of the air speed indicating units designated generally by 276. One of the air speed indicating units 276 is positioned upon the instrument panel 29 as seen in Fig. 1 in such a manner that its dial 278 and pointer 280 are visible to the student inside fuselage 12. The other indicator 276 is positioned upon the conventional instructor's desk so that its dial 278 and needle 280 are visible to the instructor. As is well known each of the dials 278 is graduated in the same manner as the dial of the air speed indicator in a real plane and each of the needles 280 is mounted upon the output shaft of its associated receiver 274 for movement over its associated dial in response to a rotation of the input shaft 266 of the transmitter 270.

Transmitter 270 and the receivers 274 which are electrically connected by means of the cables 272 are of the type that whenever the input shaft 266 of the transmitter 270 moves through a certain number of degrees, the output shaft of each of the receivers 274 upon each of which is affixed one of the needles 280 have a simultaneous movement of the same magnitude imparted thereto. The electrical connection may be made so that upon a rotation of the input shaft of the transmitter in one direction the output shaft of each of the receivers rotates in a selected direction, while reversal of direction of the rotation of the input shaft results in a reversal of direction of the movement of the output shaft of each of the receivers.

Referring now to Figs. 6 and 7 it will be appreciated that whenever the lower end of the operating arm 240 of the air speed regulator valves 228 is moved clockwise as seen from the left in the drawings, the needle 238 is moved toward the seat 246 and less vacuum will be applied from the vacuum line 226 to the vacuum line 254 which connects with the interior of the bellows 256. On the other hand, if the lower end of the operating arm 240 is rotated counterclockwise, the needle 238 moves away from the seat 246 and more vacuum passes through valve 228.

The apparatus which is conventionally incorporated in the fuselage 12 for moving the operating arm 240 is not disclosed herein in detail. However, for a detailed disclosure thereof, reference is made to my copending application Serial Number 619,361 filed September 29, 1945 for Aviation trainer. For the purpose of this application it is sufficient to know that the lower end of the operating arm 240 is always positioned in accordance with the combined factors which are developed by apparatus within the trainer to position an element according to the assumed air speed of the trainer. As disclosed in U. S. Patent 2,099,857 issued to Edwin A. Link, the factors in question are the setting of the simulated throttle lever which is conventionally placed in these trainers as well as the pitching position of the fuselage 12. As disclosed in the copending application just mentioned above, the lower end of arm 240 is positioned in accordance with the combined factors of manifold pressure and pitching position of the fuselage 12. Manifold pressure in turn depends upon the combined factors of throttle lever setting, propeller governor control lever setting and assumed altitude. The invention disclosed herein will be found by those skilled in the art to be readily adaptable to trainers having a control system like that shown in U. S. Patent 2,099,857, as well as to trainers having a control system such as that disclosed in my previously mentioned copending application. Also, it may be adapted to other types of grounded aviation trainers.

The lower end of lever 240 seen in Fig. 6 is therefore responsive to the operation of the various units within the fuselage 12 which are arranged to produce factors corresponding to the air speed of a real airplane. Lever 240 is operated by the output of these units so that when any factor is changed in such a manner as to produce a lower assumed air speed, the lower end of lever 240 moves to close valve 230, and the lower end of lever 240 is moved so as to open the valve whenever the operation of the units which affect assumed air speed is such that an increase in assumed air speed occurs.

It will therefore be appreciated that whenever a decrease in assumed air speed occurs, the lever 240 is moved and the needle valve shown in Fig. 7 is operated so that a lesser amount of vacuum passes from the line 226 to the interior of bellows 256 by means of the vacuum line 254. An expansion of bellows 256 will therefore occur—this expansion being proportional to the assumed drop in air speed and the shafts 262 and 266 will be rotated counterclockwise as seen from the left by the action of spring 264. By means of the transmitting system the needles 280 of each of the indicators 276 will be rotated counterclockwise and thus a lower assumed air speed will be indicated to the student and instructor.

On the other hand, should the units within the fuselage 12 which develop factors determining the assumed air speed operate in such a manner as to produce an increase in assumed air speed, the lower lever 240 will be moved to open valve 228, and a larger amount of vacuum will be applied from the vacuum line 226 to the vacuum line 254 and the interior of the bellows 256. Bellows 256 will therefore collapse and the shafts 262 and 266 will be rotated clockwise as seen from the left. Each of the needles 280 will be rotated clockwise over its associated dial 278 and a higher assumed air speed will be indicated to the student and instructor.

The above should make it clear that the lever 240 is always positioned according to the instant assumed air speed, and consequently the opening of valve 228 is always in accordance with the instant assumed air speed. Accordingly, bellows 256 will always be distended according to the instant assumed air speed and the rotatable positions of the shafts 262 and 266 will always be similarly positioned. Inasmuch as the position of each of the needles 280 relative to its associated dial 278 is always dependent upon the rotatable position of the shaft 262, it will be appreciated that the position of each needle 280 relative to its associated dial 278 will always indicate to the student and instructor the instant assumed air speed.

Reference is again made to Fig. 6 where a second self-synchronous transmitting device is designated generally by 284, and its housing by 286. Transmitter 284 is connected by means of electrical cable 288 to the self-synchronous receiver 290 which is seen to form a part of the air speed follow-up unit designated generally in Fig. 6 by 291.

In Fig. 6 the housing of receiver 290 is number 292 and the output shaft 294 of the receiver is shown. Upon this output shaft is affixed the spur gear 296. The rod 298 is rigidly mounted in the frame (not shown) of the unit, and the frame is affixed to the floor 12a of the fuselage 12. Rotatably mounted upon rod 298 is the gear 300 carrying the contact 302. A pair of split contact segments 304 and 306 are affixed to the insulating disc 308 which, in turn, is affixed to the gear 310 driven by the output shaft 312 of the reversible follow-up motor 314. Gear 310, insulating disc 308 and contact segments 304 and 306 are all mounted for rotation as a unit upon the fixed rod 298. A pair of spring contacts 316 and 318 are held by the frame of the unit so as to bear against the contact segments 304 and 306, respectively. Each of the spring contacts 316 and 318 is connected to the motor 314 through one of the conductors 320 or 322. Contact 302 is grounded to the frame of the unit.

Assuming that the lower end of lever 240 seen in Fig. 6 is moved as a result of an increase in assumed air speed, as previously explained a greater amount of vacuum is admitted to the interior of bellows 256 and this bellows is collapsed by an amount dependent upon the increase in assumed air speed. String 260 is pulled upwardly against the action of spring 264 and the input shaft 262 of the transmitter 284 is rotated clockwise. The electrical connection 288 between transmitter 284 and receiver 290 is such that whenever the input shaft 262 of transmitter 284 is rotated clockwise, the output shaft 294 of the receiver 290 is rotated counterclockwise and gear 300 carrying the contact 302 is rotated clockwise. Assuming, as is the case, that previous to the change in the assumed air speed the contact 302 was in engagement with both of the contact segments 304 and 306, the contact 302 is moved out of engagement with segment 306 but continues in engagement with contact 304, and motor 314 will be energized and its output shaft 312 will be rotated counterclockwise. Gear 310, insulating disc 308 and the contact segments 304 and 306 will be rotated clockwise, motor 314 continuing to run to rotate these elements until both of the contact segments 304 and 306 are again in engagement with the contact 302. At this instant, motor 314 will stop. As a result of the clockwise rotation of the gear 310, the gear 324 which is affixed upon shaft 326 which in turn is rotatably mounted in brackets (not shown) held by the floor 12a of the fuselage 12 will be rotated counterclockwise.

On the other hand referring to Fig. 6, should the lower end of lever 240 be moved as a result of a decrease in assumed air speed, it will be appreciated that the apparatus shown in Fig. 6 will be operated in such a manner that the output shaft 294 of the receiver 290 will be rotated clockwise as will gear 296. Gear 300 will be rotated counterclockwise so that the contact 302 is moved out of engagement with contact segment 306 but it will remain in contact with the segment 304. Motor 314 will be energized to rotate its output shaft 312 clockwise and the gear 310, insulating disc 308 and contact segments 304 and 306 will all be rotated counterclockwise until the contact 302 is again in engagement with both of the segments 304 and 306. At this instant motor 314 will stop. The counterclockwise rotation of gear 310 will result in a clockwise rotation of gear 324. Consequently the statement may be made that the gear 324 is rotated counterclockwise in response to an increase in the assumed air speed, and that the angle through which this gear is so rotated is proportional to the magnitude of the change in assumed air speed. Also gear 324 is rotated clockwise in response to a decrease in assumed air speed and the angle through which it is so rotated is proportional to the magnitude of the change in assumed air speed. Accordingly, the gear 324 is always positioned in rotation from a predetermined initial point according to the instant assumed air speed, so the position of this gear may be taken as a measure of the instant assumed air speed.

In Fig. 6 it will be seen that the gear 328 is driven by gear 324, gear 328 being affixed upon the left end of shaft 330 which extends transversely of the fuselage 12 and is mounted in suitable brackets affixed to the bottom of the fuselage. Upon the right end of shaft 330 is affixed the eccentric spiral cam 332 which coacts with the reciprocable arm 334 which is also shown in Fig. 2. It will be appreciated that the shaft 330 and the spiral cam 332 are always positioned in accordance with the instant assumed air speed.

Reference is now made to Fig. 2 which discloses in detail the artificial horizon bank drive assembly which is designated generally by 336. It will be seen that this assembly comprises a frame member 338 which is affixed to the floor 12a of the fuselage 12 as well as a carriage 340 which is arranged for reciprocation along the rods 342 which are fixed in the frame 338. It will be seen that an eccentric spiral groove 344 is placed in the right side of the cam 332. Coaxial with the shaft 330 is the extension 330a which extends through the slot 346 in the arm 334 in order to guide the arm. A stud 348 is affixed to the left side of arm 334 and its outermost end is placed in the spiral groove 344. Rotatably mounted in the rear end of arm 334 is the stud 350, the right end of which is affixed to the carriage 340.

It will be appreciated that as a change in assumed air speed occurs, the cam 332 is rotated about the axis of shaft 330, this cam being rotated counterclockwise as seen in Fig. 2 in response to an assumed increase in air speed and clockwise in response to an assumed decrease in air speed. As cam 332 is rotated, it will also be appreciated that the coaction of stud 348 with the spiral slot 344 will result in a movement of the carriage 340 along the rods 342. Inasmuch as the cam 332 is rotated counterclockwise as seen in Fig. 2 in response to an increase in assumed air speed, the carriage 340 will move toward the front of the fuselage 12 as assumed air speed increases. On the other hand a decrease in assumed air speed results in a clockwise rotation of cam 332 as seen in Fig. 2 and the coaction of slot 344 with stud 348 results in a movement toward the rear of the fuselage 12 of the carriage 340. Accordingly, carriage 340 is always positioned fore and aft of the rods 342 in accordance with the instant assumed air speed— the higher the assumed air speed the farther toward the front is the carriage.

Still referring to Fig. 2 it will be seen that there is affixed to the right ear 34 of the universal joint 14 a stud 352, to the outer end of which is pivotally connected the lower end of the vertical link 354. The upper end of link 354 is pivotally connected to the forward end of the arm 356, the rear end of which is affixed upon the transverse shaft 358, the right end of which is suitably rotatably mounted in a bracket (not shown) which is affixed to the floor 12a of the fuselage. The left end of shaft 358 is mounted for rotation in the bracket 62 and affixed upon the left end of this shaft is the wheel 360 having a flat periphery. As seen in Fig. 2B there is formed integrally with wheel 360 a stud 362 which passes through a hole (not shown) in the endless flexible steel belt 364 which is wrapped around the wheel 360 as shown. Belt 364 also wraps around the pulley 366 which is provided with a stud similar to the stud 362 shown in Fig. 2B, the stud upon pulley 366 similarly being positioned in a second corresponding hole in the belt 364. A second belt 370 which is offset from and similar in all details to the belt 364 also is wrapped around the pulley 366 which has a second engaging stud so that belt 370 may be exactly driven by pulley 366. As shown, belt 370 also wraps around the pulley 372 which is also provided with an engaging stud so as to be driven by belt 370. A final drive belt 374 is driven by means of the same stud arrangement by the pulley 372 and this belt 374 drives the pulley 376 by virtue of a stud and hole arrangement such as has been previously described.

It will be seen that the U-shaped bracket 378 seen in Fig. 2 is fixedly held by the adjusting screw 380 which is held by the bracket 62. The shaft 368 is supported by the rear arms of the U-shaped bracket 378 and by the forward ends of each of the two links 382. The rear ends of each of the links 382 encircle the rod 384 which supports the upper ends of each of the downwardly extending links 386. The lower end of each of the links 386 encircles the shaft 388 upon the right end of which is mounted the slotted crank 390.

Referring to Fig. 2 it will be appreciated that as changes in assumed air speed occur, the carriage 340 reciprocates along the rods 342. Accordingly, the lower ends of the links 386 move back and forth and the angle between the links 386 and the links 382 changes, resulting in a lowering and raising of the rear ends of the links 382. As this motion occurs the surfaces of belt 374 engaging the pulleys 376 and 372 changes but no rotation of either of these pulleys occurs because the pulleys are held against rotation by the elements connecting the pulleys and the stud 352 held by ear 34 of pedestal 15. Further, as the just mentioned motions occur, the shaft 384 and pulley 372 move up and down resulting in a change in the angle between the links 382 and the arms of the U-shaped bracket 378. The position of the endless belt 370 relative to the pulleys 372 and 366 also changes but no rotation of either of these pulleys occurs. Inasmuch as no rotation of either of the three pulleys 366, 372 or 376 occurs with a change in assumed air speed, it will be appreciated that the shaft 388 and crank 390 are not rotated as a result of a change in assumed air speed. Accordingly, the shaft 388 and crank 390 are moved about the axis of the shaft 388 only by changes in the banking position of the fuselage 12.

Still referring to Fig. 2 it will be seen that the stub shaft 392 is rotatably mounted in the bracket 393 which is affixed to the floor 12a, and affixed upon the left end of this stub shaft is the cam 394. Carried by the cam 394 is the stud 402, the left end of which engages the slot in the crank 390. Also rotatably mounted within the bracket 393 is the stud 404, upon the outer end of which is affixed the upper end of arm 406 integral with the lower end of which is the sector 408. Carried by the intermediate portion of the arm 406 is the stub shaft 410, upon the outer end of which is mounted the roller 412. The rear end of cable 414 lies along the lower outer surface of sector 408 and is affixed to this sector by the anchor 416. Cable 414 extends ahead of the fuselage 12 to a reversing pulley arrangement 418 which is like the arrangement shown in Fig. 2A. A second cable 414a connects with the reversing pulley arrangement 418, encircles pulleys 420, 422 and 424, and passes through the slot 74 in the casing 76 of the artificial horizon simulator 72.

Referring now to Fig. 3 it will be seen that the upper end of cable 414a passes through a hole in bracket 146 and encircles the pulley 426 which is fixedly mounted upon the shaft 428 which is rotatably held by the members 126c and 126d of the casting 126. Pulley 426 is identical in construction with the pulley shown in Fig. 3A and therefore a detailed explanation of its construction will not be given. However, it should be mentioned that the spring 440 has its outer end anchored to the stud 442 which is affixed to the casting member 126c, and has its inner end affixed to the hub of pulley 426 in order to apply a constant clockwise bias to the pulley 426, so as to keep cable 414a taut at all times. Affixed upon the forward end of shaft 428 is the spur gear 430 which meshes with the gear sector 432 which is integral with the casting member 130b. Referring back to Fig. 2 it will be recalled that the carriage 340 is always positioned fore and aft along the rods 342 according to the instant assumed air speed. Accordingly, the shaft 388 and the crank 390 are always positioned fore and aft in accordance with the instant assumed air speed, and stud 402 is displaced from the shaft 388 which holds crank 390 a distance in accordance with the instant assumed air speed. Whenever the fuselage 12 is banked toward the left, it will be appreciated that the vertical link 354 pulls downwardly upon the outer end of arm 356, rotating shaft 358 clockwise as seen from the right side of the trainer. The wheel 360 therefore rotates in the same direction and by means of pulleys 366, 372, 376 and the steel belts 364, 370 and 374, the shaft 388 is rotated in the same direction, namely, clockwise as seen from the right. Accordingly, the rear end of crank 390 is moved upwardly. On the other hand it will be appreciated that whenever the fuselage 12 is banked towards the right, the preceding mentioned parts are moved in the opposite directions and the rear end of crank 390 will move downwardly. Crank 390 may be initially adjusted so that when the fuselage 12 is in the level banking position, this crank is horizontally positioned. Accordingly, when the fuselage is banked to the left the crank 390 is rotated clockwise through an angle proportional to the degree of bank from the initial level position, and when the fuselage is banked to the right the crank is rotated counterclockwise from the initial level position through a proportional angle.

By displacing the axis of rotation of crank 390 from the axis of stud 402 a distance proportional to the instant assumed air speed, and then by rotating crank 390 through an angle and in a direction dependent upon the angle and direction of bank of fuselage 12, it will be appreciated that the cam 394 will be rotated through an angle dependent upon the combined factors of instant assumed air speed and degree of bank of the fuselage, and that the direction of rotation of the cam 394 will be dependent upon the direction of bank of the fuselage.

Reference is now made to Fig. 5 which is an elevational view of cam 394 and its associated elements shown in their proper relative positions for the level banking condition of the fuselage. It will be appreciated, considering Figs. 2 and 5, that when the fuselage 12 is banked to the left cam 394 is rotated clockwise through an angle dependent upon the instant assumed air speed and degree of bank. Accordingly, the reversing pulley arrangement 418 pulls upon cable 414 and the rotation of cam 394 allows the roller 412 to move closer to the center of rotation of the shaft. Accordingly, the lower end of sector 408 moves ahead as does the rear end of cable 414, and by virtue of the reversing pulley arrangement 418, the upper cable 414a is pulled away from the simulator 72.

It will be appreciated therefore that whenever the cable 414a is pulled away from the simulator 72, the pulley 426 will be rotated counterclockwise as seen in Fig. 3 and sector 432 will be rotated in the opposite direction resulting in a clockwise rotation of the casting 130 about the axis through shaft 134 and hollow bearing 144. As casting 130 rotates all of the parts carried thereby including the sector 168 and the horizon bar 172 and its integral support 174 will be moved therewith. Accordingly, the left end of horizon bar 172 moves upwardly with respect to the airplane simulating element 124 and the right end of horizon bar 172 moves downwardly with respect to the airplane simulating element. Consequently, the left wing of the airplane simulating element 124 is below the horizon bar 172 while the right wing of this element is above the horizon bar. Thus the instrument will indicate to the student within the fuselage 12 that the fuselage is banked to the left. At the same time, the movement of casting 130 results in a movement of the background plate 140 and of the index pointer 142 in the clockwise direction, and the student in the trainer may ascertain the assumed degree of bank to the left by noting the position of pointer 142 relative to the index scale 86. It will be appreciated that the magnitude of the movements of all of the just mentioned parts is dependent upon the factors of instant assumed air speed and degree of bank to the left of the fuselage. Accordingly, the angular movement between the horizon bar 172 and airplane simulating element 124 as well as the rotation of index element 142 relative to scale 86 is dependent upon the factors of instant assumed air speed and degree of bank of the fuselage.

On the other hand, when the fuselage 12 is banked to the right, cam 394 is rotated counterclockwise through an angle dependent upon the instant assumed air speed and degree of bank. This rotation of cam 394 results in a movement of roller 412 away from the axis of rotation of the cam and the lower end of sector 408 moves to the rear, pulling the rear end of cable 414 in the same direction. However, the reversing pulley arrangement 418 results in a movement toward the simulator 72 of the upper cable 414a and the spring 440 rotates pulley 426 clockwise.

The clockwise rotation of pulley 426 will result in a clockwise rotation of gear 430 and a counterclockwise rotation of sector 432. Accordingly, casting 132 and all of the parts carried thereby including the horizon bar 172 will be rotated counterclockwise about the axes of shaft 134 and hollow bearing 144. The left end of the horizon bar 172 will be moved to a position below the left wing of the airplane simulating element 124 and the right end of the horizon bar 172 will be moved above the right wing of the airplane simulating element. At the same time the index element 142 will be rotated counterclockwise relative to the index scale 86. Accordingly, the student within the fuselage 12 will have visually indicated to him by the simulator 72 the fact that the fuselage 12 is banked toward the right as well as the assumed degree of bank. The angular movement in any case is such as to indicate the correct angle of bank for any instant rate of turn as well as any instant indicated air speed, provided the ball of the turn indicator is centered which indicates a properly coordinated turn.

As in the case of the use of the real artificial horizon carried by planes in actual flight, the student will generally ascertain the direction of bank by referring to the position of the horizon bar 172 relative to the airplane simulating element 124, but he will ascertain the degree of bank by noting the position of the index element 142 relative to the index marks 90.

It will be appreciated that the disclosed system will properly function to simultaneously indicate banking and pitching movements of the fuselage.

It should be pointed out that the ratios of movements which may be incorporated in my invention may be such that when the fuselage 12 is pitched a given number of degrees the horizon bar will be moved a larger number of degrees. This may be desirable because the degree of pitch of fuselage 12 is limited, and it may be desirable to simulate greater angular pitching movements of an airplane than the actual pitching of the fuselage 12 will permit. The same also is true of the ratios in the banking mechanism of this invention.

It will be appreciated that many changes may be made in the preferred disclosed embodiment of this invention without departing from the spirit thereof, and also that this invention may be used in conjunction with trainers of different types than disclosed herein. All such changes in construction and variations in uses are intended to be covered by the following claims.

I claim:

1. In a grounded aviation trainer of the type comprising a fuselage pivotally mounted upon a stationary base for banking movements simulating the banking movements of a plane in actual flight, the combination of indicating means for indicating the instant assumed banking position of the fuselage, a first movable member forming a part of said trainer and means for positioning the same in accordance with the instant banking position of said fuselage relative to said stationary base, a second movable member forming a part of said trainer and means for positioning said second movable member in accordance with the instant assumed air speed of said trainer, and means interconnecting said movable members and said bank-indicating means for positioning said bank-indicating means in accordance with the instant combined positions of said two movable members.

2. In a grounded aviation trainer of the type comprising a fuselage pivotally mounted upon a stationary base for banking movements simulating the banking movements of a plane in actual flight, means for simulating the operation of the artificial horizon of a real plane, said means comprising, in combination: an artificial horizon simulator including frame means, an airplane simulating member held by said frame means, a carriage rotatably held by said frame means, a horizon bar held by said carriage to rotate therewith, said horizon bar being held adjacent said airplane simulating member for rotational movement relative thereto, a first movable member forming a part of said trainer and means for positioning the same in accordance with the instant banking position of said fuselage relative to said stationary base, a second movable member forming a part of said trainer and means for positioning said second movable member in accordance with the instant assumed air speed of said trainer, and means interconnecting said movable members and said carriage for positioning said carriage and horizon bar relative to said airplane simulating member in accordance with the instant combined positions of said two movable members.

3. In a grounded aviation trainer of the type comprising a fuselage pivotally mounted upon a stationary base for banking movements simulating the banking movements of a plane in actual flight, means for simulating the operation of the artificial horizon of a real plane, said means comprising, in combination: an artificial horizon simulator including frame means, an airplane simulating member held by said frame means, a carriage rotatably held by said frame means, a horizon bar held by said carriage to rotate therewith, said horizon bar being held adjacent said airplane simulating member for rotational movement relative thereto, a spring biased pulley rotatably carried by said frame means, a driving connection between said pulley and said carriage, a first movable member forming a part of said trainer and means for positioning the same in accordance with the instant banking position of said fuselage relative to said stationary base, a second movable member forming a part of said trainer and means for positioning said second movable member in accordance with the instant assumed air speed of said trainer, and means interconnecting said movable members and said pulley for positioning said pulley, carriage and horizon bar relative to said airplane simulating member in accordance with the instant combined positions of said two movable members.

KARL A. KAIL.

REFERENCES CITED

The following references are of record in the file of this patent:

UNITED STATES PATENTS

| Number | Name | Date |
|---|---|---|
| 2,099,857 | Link | Nov. 23, 1937 |
| 2,164,412 | Koster | July 4, 1939 |
| 2,183,314 | Goddard | Dec. 12, 1939 |
| 2,358,018 | Lowkrantz | Sept. 12, 1944 |
| 2,366,603 | Dehmel | Jan. 2, 1945 |
| 2,381,872 | Baker | Aug. 14, 1945 |
| 2,409,238 | Barber | Oct. 15, 1946 |